United States Patent [19]
Shimizu

[11] Patent Number: 5,461,424
[45] Date of Patent: Oct. 24, 1995

[54] DISPLAY CONTROL APPARATUS AND METHOD FOR DRIVING A DISPLAY HAVING A PLURALITY OF HORIZONTAL PIXEL LINES

[75] Inventor: Kan Shimizu, Urawa, Japan

[73] Assignee: Kabushiki Kaisha Toshiba, Kawasaki, Japan

[21] Appl. No.: 154,437

[22] Filed: Nov. 19, 1993

[30] Foreign Application Priority Data

Nov. 20, 1992 [JP] Japan .................................. 4-310712

[51] Int. Cl.⁶ ..................................................... H04N 5/66
[52] U.S. Cl. ........................... 348/443; 348/458; 348/792; 345/100
[58] Field of Search .................................... 348/443, 444, 348/454, 455–458, 790, 791, 792, 793; 345/100; H04N 5/66, 7/07, 5/46

[56] References Cited

U.S. PATENT DOCUMENTS

| | | | |
|---|---|---|---|
| 5,335,023 | 8/1994 | Edwards | 348/458 |
| 5,357,290 | 10/1994 | Horibe | 348/792 |

FOREIGN PATENT DOCUMENTS

| | | | |
|---|---|---|---|
| 284185 | 11/1989 | Japan | H04N 5/46 |
| 89476 | 3/1990 | Japan | H04N 5/66 |
| 274684 | 9/1992 | Japan | H04N 5/66 |
| 5100641 | 4/1993 | Japan | G09F 3/36 |

*Primary Examiner*—James J. Groody
*Assistant Examiner*—Glenton B. Burgess
*Attorney, Agent, or Firm*—Cushman, Darby & Cushman

[57] ABSTRACT

A display control apparatus includes an X-driver for sequentially obtaining the horizontal picture signals from a PAL video signal, and supplying the obtained signal to each of the horizontal pixel lines of an NTSC liquid crystal display panel, and a Y-driver for sequentially selecting the horizontal pixel lines, in a preset number every time the X-driver supplies a horizontal picture signal to each of the horizontal pixel lines. In particular, the Y-driver includes logic gate circuit for updating the preset number on the basis of a selection pattern in which at least first and second numbers of horizontal picture lines are determined as selection units of lines to be selected at one time, the selection units are combined at a predetermined ratio, and the combination of the selection units is repeated for each predetermined number of the horizontal picture signals, thereby assigning the horizontal pixel lines to almost all the horizontal picture signals.

14 Claims, 7 Drawing Sheets

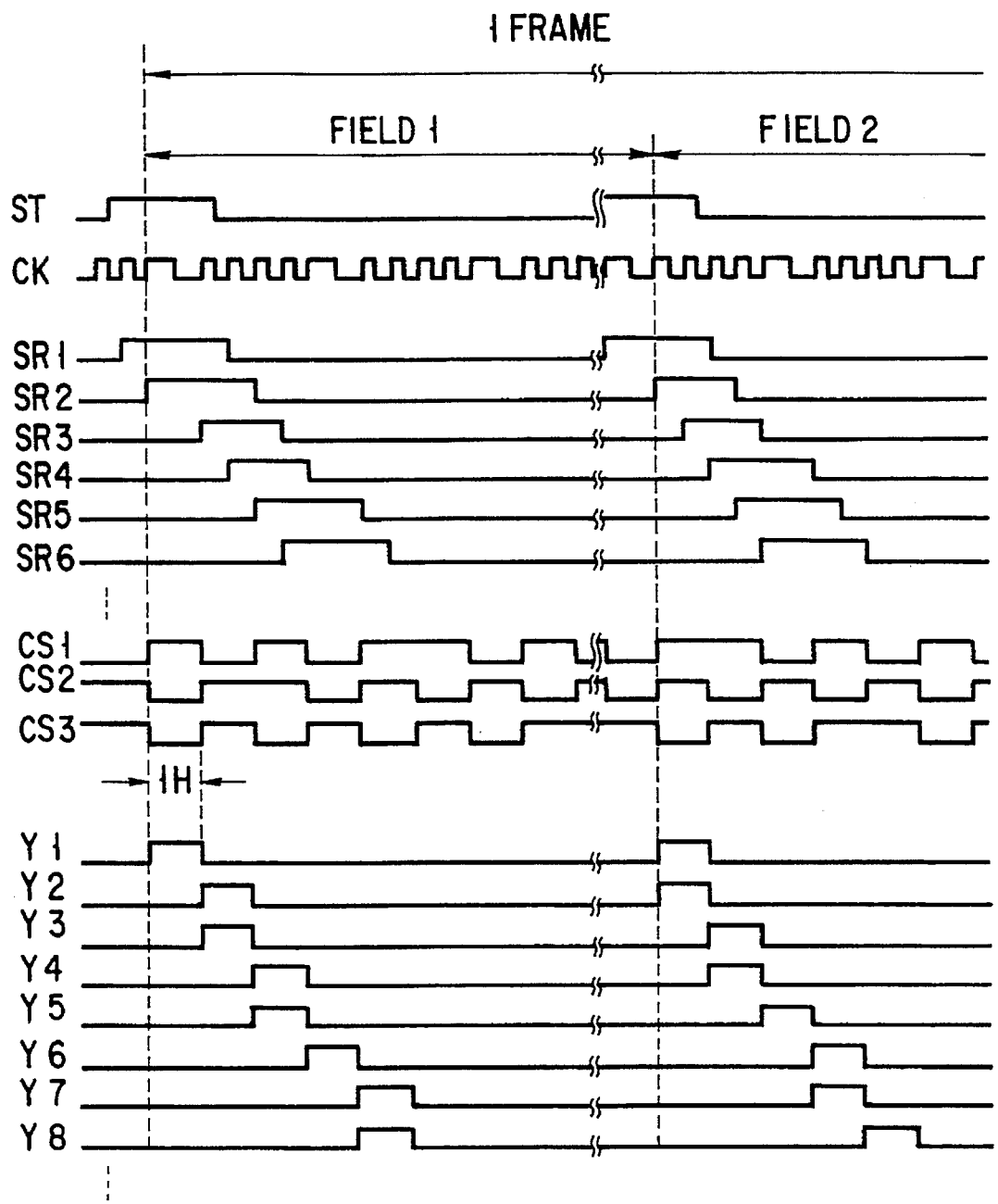
F I G. 6

| | |
|---|---|
| L1 | S1 |
| L2 | S2 |
| L3 | S2 |
| L4 | S3 |
| L5 | S3 |
| L6 | S4 |
| L7 | S4 |
| L8 | S5 |
| L9 | S5 |
| ⋮ | ⋮ |
| L469 | S235 |
| L470 | S236 |

REPETITION UNIT

FIG. 7A

| | |
|---|---|
| L1 | S237 |
| L2 | S237 |
| L3 | S238 |
| L4 | S238 |
| L5 | S239 |
| L6 | S239 |
| L7 | S240 |
| L8 | S240 |
| L9 | S241 |
| ⋮ | ⋮ |
| L469 | S471 |
| L470 | S471 |

REPETITION UNIT

FIG. 7B

| | |
|---|---|
| L1 | S 1 |
| L2 | S 2 |
| L3 | S 2 |
| L4 | S 3 |
| L5 | S 3 |
| L6 | S 4 |
| L7 | S 5 |
| L8 | S 5 |
| L9 | S 6 |
| ⋮ | ⋮ |
| L469 | S 282 |
| L470 | S 282 |

REPETITION UNIT

FIG. 8A

| | |
|---|---|
| L1 | S 283 |
| L2 | S 283 |
| L3 | S 284 |
| L4 | S 284 |
| L5 | S 285 |
| L6 | S 286 |
| L7 | S 286 |
| L8 | S 287 |
| L9 | S 287 |
| ⋮ | ⋮ |
| L469 | S 563 |
| L470 | S 564 |

REPETITION UNIT

FIG. 8B

DISPLAY CONTROL APPARATUS AND METHOD FOR DRIVING A DISPLAY HAVING A PLURALITY OF HORIZONTAL PIXEL LINES

BACKGROUND OF THE INVENTION

1. Field of the Invention

The present invention relates to a display control apparatus and method for a flat panel display having lines of pixels arrayed in a horizontal scanning direction and, more particularly, to a display control apparatus and method used for driving the display by means of a video signal of a scheme which has a larger number of horizontal picture signals per frame than the number of the horizontal pixel lines.

2. Description of the Related Art

The NTSC (National Television System Committee) scheme and the PAL (Phase Alternation by Line) scheme are known as video signal standards used in color television sets using CRT displays in which interlace scanning is performed. The NTSC scheme has a one-frame image display period of 525H (H: horizontal scanning period) equal to 1/30 sec. The PAL scheme has a one-frame image display period of 625H (H: horizontal scanning period) equal to 1/25 sec.

FIG. 1 shows an NTSC video signal for a one-frame image, and FIG. 2 shows a PAL video signal for a one-frame image. In interlace scanning, horizontal scanning lines are sequentially drawn to scan an odd field on the CRT screen, and then sequentially drawn to scan an even field on the CRT screen. After scanning each field, the current scanning position is returned to a scanning start position for the next field within a vertical blanking period TG shown in FIGS. 1 and 2. Since the vertical blanking period TG and other sync. control periods must be included in the one-frame image display period, this restricts the number of horizontal scanning lines which can be actually drawn on the screen in accordance with each video signal VS. Therefore, the number of effective horizontal picture signals Sm is reduced to about 470 in the NTSC video signal, and to about 570 in the PAL video signal.

A flat panel display such as a liquid crystal display has a plurality of horizontal pixel lines, which are equivalent to the horizontal scanning lines on the CRT screen. In display control of the liquid crystal display, all the horizontal pixel lines are driven within a field scanning period by sequentially selecting pairs of adjacent horizontal pixel lines and supplying a horizontal picture signal to a selected pair of horizontal pixel lines. This control is performed to remedy a problem that the image quality is lowered as compared with a CRT display when half of the horizontal pixel lines are driven within the field scanning period.

Liquid crystal displays have a greater advantage in portability than CRT displays. However, when a liquid crystal display is brought to a country where the PAL scheme is determined as the domestic video signal standard, the display would not operate normally. A PAL video signal has about 570 horizontal picture signals, which is remarkably larger in number than the 470 horizontal pixel lines provided in a typical NTSC liquid crystal display. Since shortage of horizontal pixel lines arises, it is difficult to display images without deleting an upper or bottom portion thereof.

Conventionally, the following display control apparatuses have been developed to compensate for a difference between the number of horizontal picture signals in a PAL video signal and the number of horizontal pixel lines in a liquid crystal display.

The first display control apparatus stores a PAL video signal for one frame in a frame memory (or line memories), and performs interpolation and decimation on the horizontal picture signals contained in the stored PAL video signal by using a digital processor in order to reduce the number thereof to about 235 per field. In a field scanning period, each of the remaining horizontal picture signals is supplied to a corresponding pair of horizontal pixel lines. However, the manufacturing cost of the apparatus is increased due to the use of the frame memory and the digital processor.

The second display control apparatus uses all the horizontal picture signals contained in a PAL video signal by assigning five horizontal pixel lines in the liquid crystal display to three horizontal picture signals. Therefore, while all the horizontal pixel lines are sequentially selected, the first horizontal signal is supplied to the first and second pixel lines, the second horizontal picture signal is supplied to the third and fourth pixel lines, and third horizontal picture signal is supplied to the fifth pixel line, for example. Since no horizontal picture signal is deleted in the second display control apparatus, this apparatus can display more natural images as compared with the first display control apparatus. However, the second display control apparatus has a configuration in which an extra line memory or the like must be provided. This increases the manufacturing cost of the apparatus.

SUMMARY OF THE INVENTION

An object of the present invention is to provide a display control apparatus and method in which a frame memory or an extra line memory is not required to compensate for a difference between the number of horizontal picture signals in a video signal and the number of horizontal pixel lines in a flat panel display, without making displayed images unnatural.

This object can be attained by a display control apparatus for driving a display having N horizontal pixel lines in accordance with a video signal containing M horizontal picture signals per field, M being less than N, comprising: a supplying section for sequentially obtaining the horizontal picture signals from the video signal, and supplying the obtained horizontal picture signal to each of the horizontal pixel lines; and a selecting section for sequentially selecting the horizontal pixel lines, in a preset number every time the supplying section supplies a horizontal picture signal to each of the horizontal pixel lines; wherein the selecting section includes an updating section for updating the preset number on the basis of a selection pattern in which at least first and second numbers of horizontal picture lines are determined as selection units of lines to be selected at one time, the selection units are combined at a predetermined ratio, and the combination of the selection units is repeated for each predetermined number of the horizontal picture signals, thereby assigning the horizontal pixel lines to almost all the effective horizontal picture signals.

The object of the present invention can also be attained by a display control method for driving a display having N horizontal pixel lines in accordance with a video signal containing M horizontal picture signals per field, M being less than N, comprising the steps of: sequentially obtaining the horizontal picture signals from the video signal, supplying the obtained signal to each of the horizontal pixel lines; and sequentially selecting the horizontal pixel lines, in a preset number every time the supplying step supplies a horizontal picture signal to each of the horizontal pixel lines; wherein the selecting step includes a step of updating the preset number on the basis of a selection pattern in which at least first and second numbers of horizontal picture lines are determined as selection units of lines to be selected at one time, the selection units are combined at a predetermined ratio, and the combination of the selection units is repeated for each predetermined number of the horizontal picture signals, thereby assigning the horizontal pixel lines to almost all the effective horizontal picture signals.

When a display having N horizontal pixel lines is driven in accordance with a video signal containing M horizontal picture signals per field, M being less than N, the display control apparatus and method sequentially selects the horizontal pixel lines, in a preset number to assign the horizontal pixel lines to almost all the horizontal picture signals. The preset number is updated on the basis of a selection pattern in which at least first and second numbers of horizontal picture lines are determined as selection units of lines to be selected at one time, the selection units are combined at a predetermined ratio, and the combination of the selection units is repeated for each predetermined number of the horizontal picture signals. Therefore, a difference between the number of horizontal picture signals in a video signal and the number of horizontal pixel lines in a flat panel display can be compensated for without decimating the horizontal picture signals. Neither an additional line memory nor a frame memory for performing a decimation process is required, and almost all the effective horizontal picture signals in the video signal are used to display an image. As a result, the image quality is improved as compared with the conventional first display control apparatus. Further, it is possible to obtain the same image quality as that of the conventional second display control apparatus.

On the other hand, the number of horizontal pixel lines to be selected at one time is updated on the basis of the selection pattern. Therefore, a complicated timing control is not needed to supply each horizontal picture signal to the horizontal pixel lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 6 is a timing chart showing various signals produced in the display controller shown in FIG. 4 when a PAL signal is supplied thereto;

FIGS. 7A and 7B are view showing horizontal pixel lines of the NTSC liquid crystal display panel, which are assigned to horizontal picture signals of the NTSC video signal in first- and second-field scanning periods, respectively; and FIGS. 8A and 8B are view showing horizontal pixel lines of the NTSC liquid crystal display panel, which are assigned to horizontal picture signals of the PAL video signal in first- and second-field scanning periods, respectively.

DETAILED DESCRIPTION OF THE PREFERRED EMBODIMENT

A liquid crystal display device according to one embodiment of the present invention will now be described with reference to the accompanying drawings.

The liquid crystal display device is primarily used in a country in which the NTSC scheme is determined as the domestic video signal standard. However, a PAL video signal is available in addition to an NTSC video signal. The liquid crystal display device is composed of an NTSC liquid crystal display panel 1 and a display controller 2.

Figure 1:
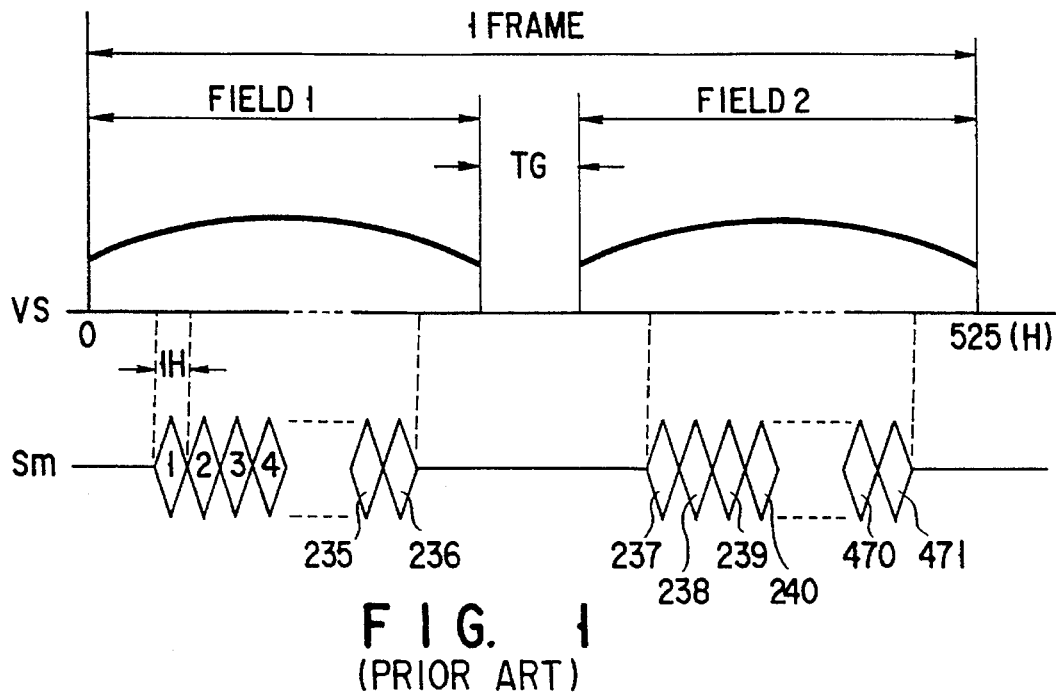
FIG. 1 is a view showing an NTSC video signal for one frame.
Figure 2:
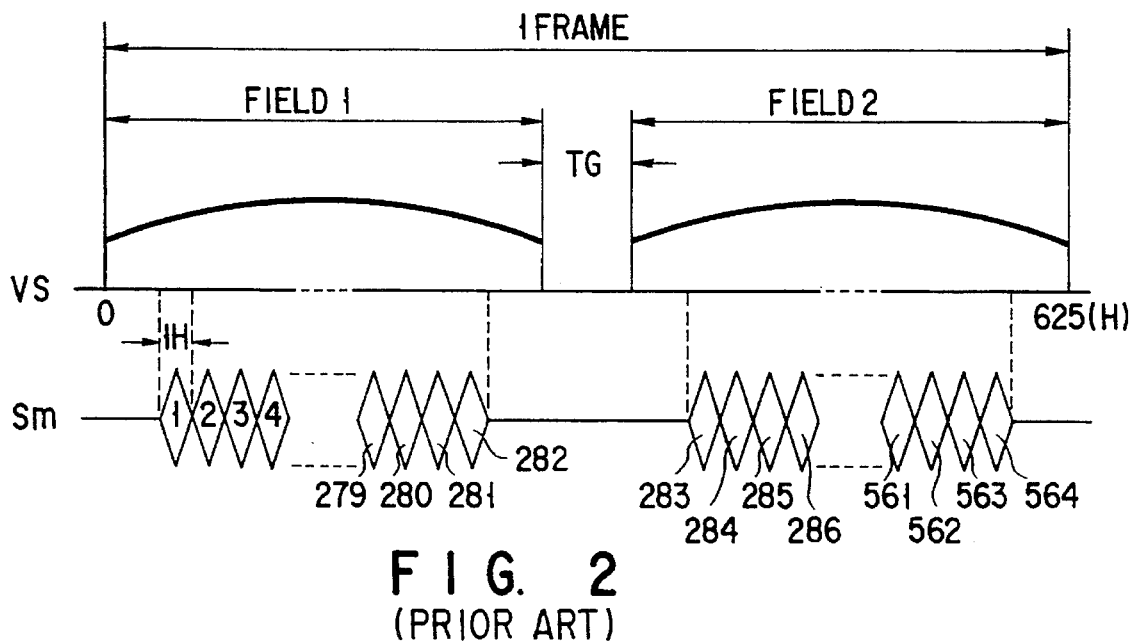
FIG. 2 is a view showing a PAL video signal for one frame.
Figure 3:
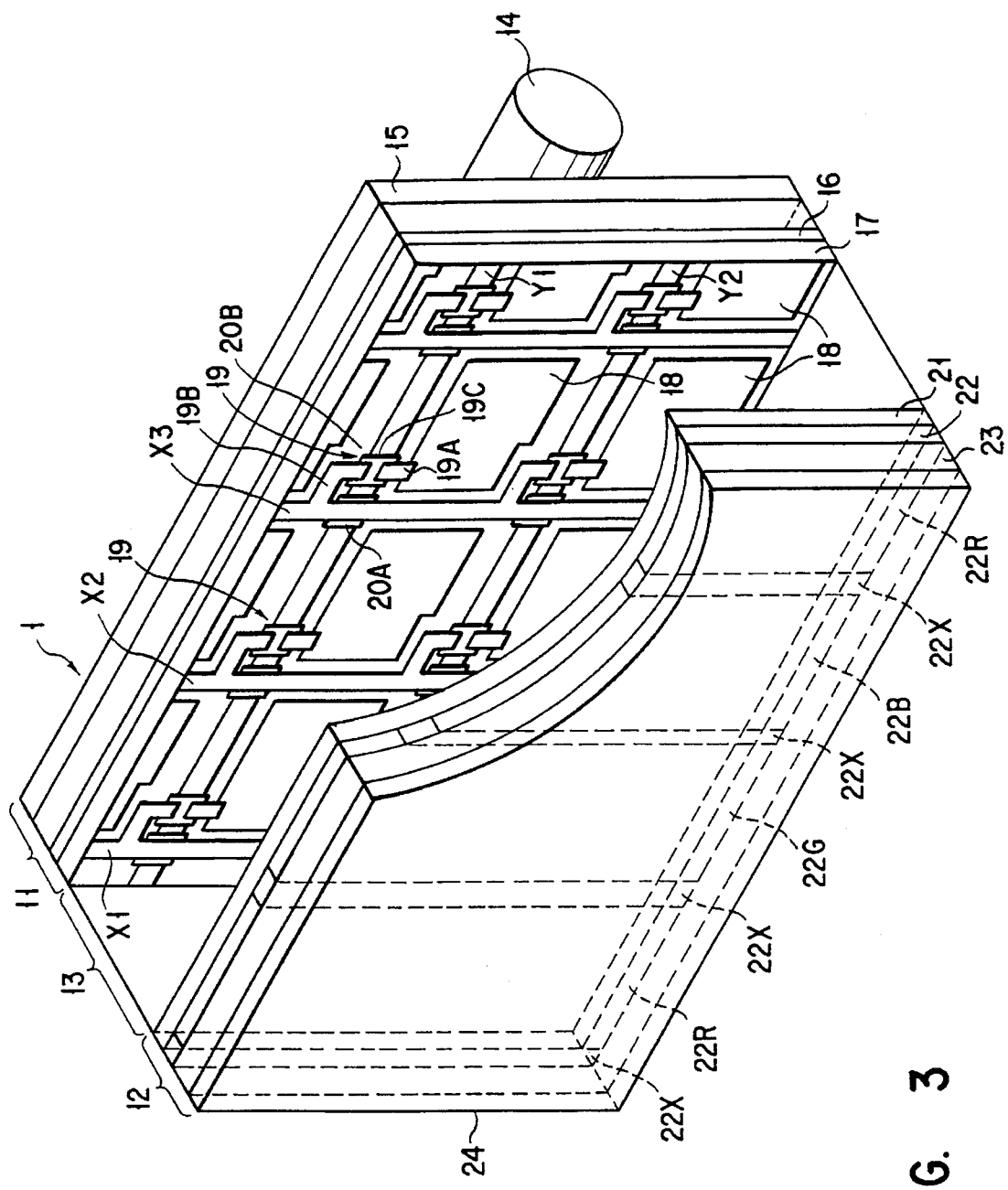
FIG. 3 is a view schematically showing a construction of an NTSC liquid crystal display panel incorporated in a liquid crystal display device according to one embodiment of the present invention.

FIG. 3 shows a part of the NTSC liquid crystal display panel. As shown in this figure, the liquid crystal display panel 1 includes a matrix array substrate 11, a counter substrate 12, and a liquid crystal layer 13, each of which has transparency. The liquid crystal layer 13 is interposed and held between the matrix array substrate 11 and the counter substrate 12. A back light 14 and a light diffusing plate are provided on the rear side of the display panel 1. The back light 14 serves as a light source of the display panel 1. The light diffusing plate 15 is disposed between the back light 14 and the liquid crystal display panel 1 to diffuse a light emitted from the back light 14.

The matrix array substrate 11 includes a polarizer 16 for polarizing the light diffused by the light diffusing plate 15, a glass plate 17 fixed to the polarizer 16, and an array of transparent pixel electrodes 18 of ITO (Indium Tin Oxide) formed on the glass plate 17. The array is formed in a matrix of 470 rows×1440 columns, the rows of which each include 1440 pixel electrodes 18 arranged in a direction equivalent to the horizontal scanning direction in a CRT screen, and the columns of which each include 470 pixel electrodes 18 arranged in a direction equivalent to the vertical scanning direction in the CRT screen. The matrix array substrate 11 further includes 470 row lines Y1–Y470, 1440 column lines X1–X1440, and 470×1440 TFTs (TFT: Thin Film Transistor) 19, which are formed on the glass plate 17. The TFTs 19 serve as analog switches. The row lines Y1–Y470 are formed along the rows of the pixel electrode array, the column lines X1–X1440 are formed along the columns of the pixel electrode array, and the TFTs 19 are formed in the vicinity of the intersections between the row lines Y1–Y470 and the column lines X1–X1440. In areas corresponding to the intersections, interlayer insulating films 20A of silicon oxide and amorphous silicon are formed to ensure the insulation between wirings. Active layers 20B of the TFTs 19 are also formed in the areas and made of amorphous silicon. (Polysilicon can also be used as a material of the active layers 20B.) The interlayer insulating films 20A are formed between the row lines Y1–Y470 and the column lines X1–X1440 to insulate them. Each of the TFTs 19 has a source electrode 19A connected to a corresponding pixel electrode, a drain electrode 19B connected to a corresponding column line, and a gate electrode formed of part of a corresponding row line. Each of the active layers 20B are interposed between the gate electrode 19C and the source and drain electrodes 19A and 19B in a corresponding TFT 19. Each of the TFTs 19 is made conductive when the corresponding row line, which serves as its gate electrode 19C, is selected, and supplies a signal on the corresponding column line, which is connected to its drain electrode 19A, to the corresponding pixel electrode 18.

The counter substrate 12 includes a transparent counter electrode 12 of ITO (Indium Tin Oxide) opposing to all the pixel electrodes 18, a color filter layer 22 covering the counter electrode 12, a glass plate 23 covering the color filter layer 22, and a polarizer 24 covering the glass plate 23. The color filter layer 22 includes 480 color filter groups each provided for three successive columns of pixel electrodes 18. Each color filter group has a read filter stripe 22R opposing to the first column of pixel electrodes 18, a green filter stripe 22G opposing to the second column of pixel electrodes 18, and a blue filter stripe 22B opposing to the third column of pixel electrodes 18. The color filter layer 22 also includes light shutter stripes 22X formed in the boundary between the read, green and blue filter stripes 22R, 22G and 22B and each opposing to a corresponding column line. The liquid crystal layer 13 is fixed to the surfaces of the matrix array and counter substrates 11 and 12 via orientation films (not shown).

In the liquid crystal display panel 1, each of the pixel electrodes 18 forms a pixel in cooperation with a corresponding TFT 19, corresponding portions of the polarizers 16 and 24, a corresponding portion of the counter electrode 21, and a corresponding portion of the color filter layer 22. Therefore, the liquid crystal display panel 1 includes 470 horizontal pixel lines L1–L470, each of which has 480 color pixel groups. Each color pixel group has three pixels of read, green, and blue, respectively.

More specifically, the pixel electrodes in each (3k–2)th (k=1,2, . . . , 480) column are used to drive red pixels, the pixel electrode in each (3k–2)th (k=1,2, . . . , 480) column are used to drive green pixels, and the pixel electrodes in each (3k)th column are used to drive blue pixels.

Figure 4:
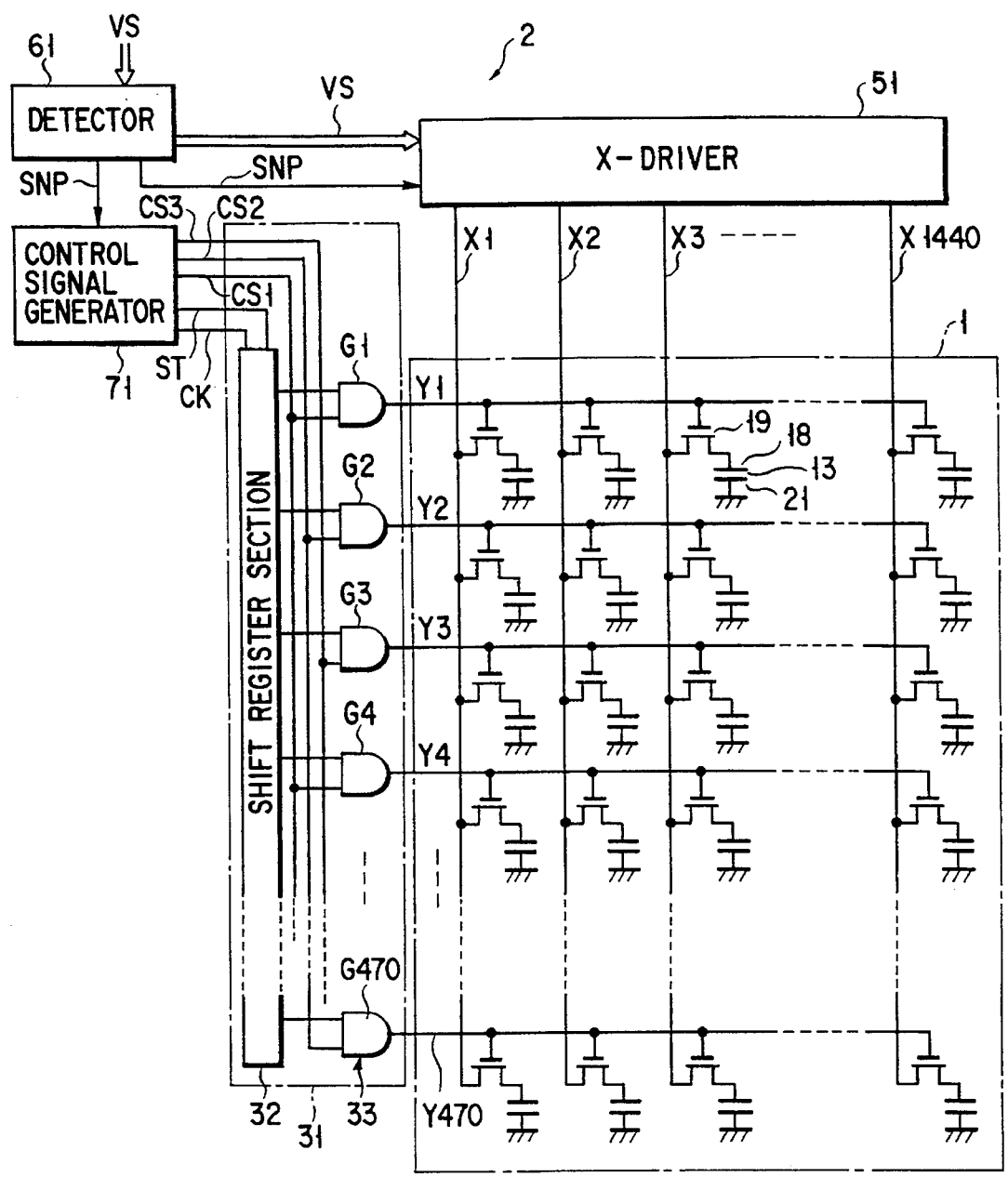
FIG. 4 is a circuit diagram schematically showing a construction of a display controller for the liquid crystal display panel shown in FIG. 3.

FIG. 4 shows a display controller 2 for the liquid crystal display panel 1. The display controller 2 includes a detector 61 for detecting the scheme of a video signal VS supplied externally, a control signal generator 71 for generating predetermined control signals in a form corresponding to the scheme of the video signal VS detected by the detector 61, a Y-driver 31 connected to the row lines Y1–Y470 of the display panel 1 for selecting the row lines Y1–Y470 according to the control signals supplied from the control signal generator 71, and an X-driver 51 connected to the column lines X1–X1440 of the display panel 1 for sequentially obtaining horizontal picture signals from the video signal VS and supplying the obtained horizontal picture signal to the column lines X1–X1440.

The detector 61 measures a period of the interval between vertical sync. signals contained in the video signal VS to detect the scheme of the video signal VS from the number of horizontal picture signals corresponding to the measured period. A result of detection is supplied to the control signal generator 71 and X-driver 51 as an identification signal SNP. The control signal generator 71 sets one of NTSC and PAL modes according to the identification signal SNP, and generates the predetermined control signals in the first form when the NTSC mode is set and in the second form when the PAL mode is set. The predetermined control signals include first, second, and third selection control signals CS1, CS2, and CS3, a start signal ST, and a clock signal CK. Start timings for generating these control signals are determined based on the time point at which the identification signal SNP is supplied, and made synchronous to the operation of the X-driver 51 during which each horizontal picture signal is supplied the X-driver 51 to the column lines X1–X1440.

The Y-driver 31 includes a shift register section 32 for obtaining the start signal ST, and performing a shift operation in which the start signal is shifted in response to the clock signal CK, and a logic gate circuit 33 for selectively supplying the contents of the shift register section 32 to the row lines Y1–Y470 according to the selection control signals CS1, CS2, and CS3. The logic gate circuit 33 includes 470 AND gates G1–G470. The AND gates G1–G470 have the first input terminals connected respectively to first to 470th bit output terminals, second input terminals connected to receive a preset one of the selection control signals CS1, CS2, and CS3, and output terminals connected respectively to the row lines Y1–Y470. The selection control signal CS1 is supplied to the AND gate corresponding to the (3n–2)th (n=1, 2, . . . , 157) bit of the shift register section 32, the selection control signal CS2 is supplied to the AND gate corresponding to the (3n–1)th (n=1, 2 . . . , 157) bit of the shift register section 32, and the control signal CS3 is supplied to the AND gate corresponding to the (3n)th (n=1, 2, . . . , 156) bit of the shift register section 32.

The X-driver 51 includes a sample and hold circuit for performing a sample and hold operation on each horizontal picture signal contained in the video signal VS, an operation amplifier for amplifying 1440 sampled signals from the sample and hold circuit, and a single line memory for storing the sampled signals supplied via th amplifier and supplying the sampled signals to the column lines X1–X1440 of the display panel 1. Sample timings and a sample period for the sample and hold circuit and output timings for the line memory are determined depending on the scheme of the video signal VS indicated by the identification signal SNP.

The operation of the liquid crystal display device will be described blow.

Figure 5:
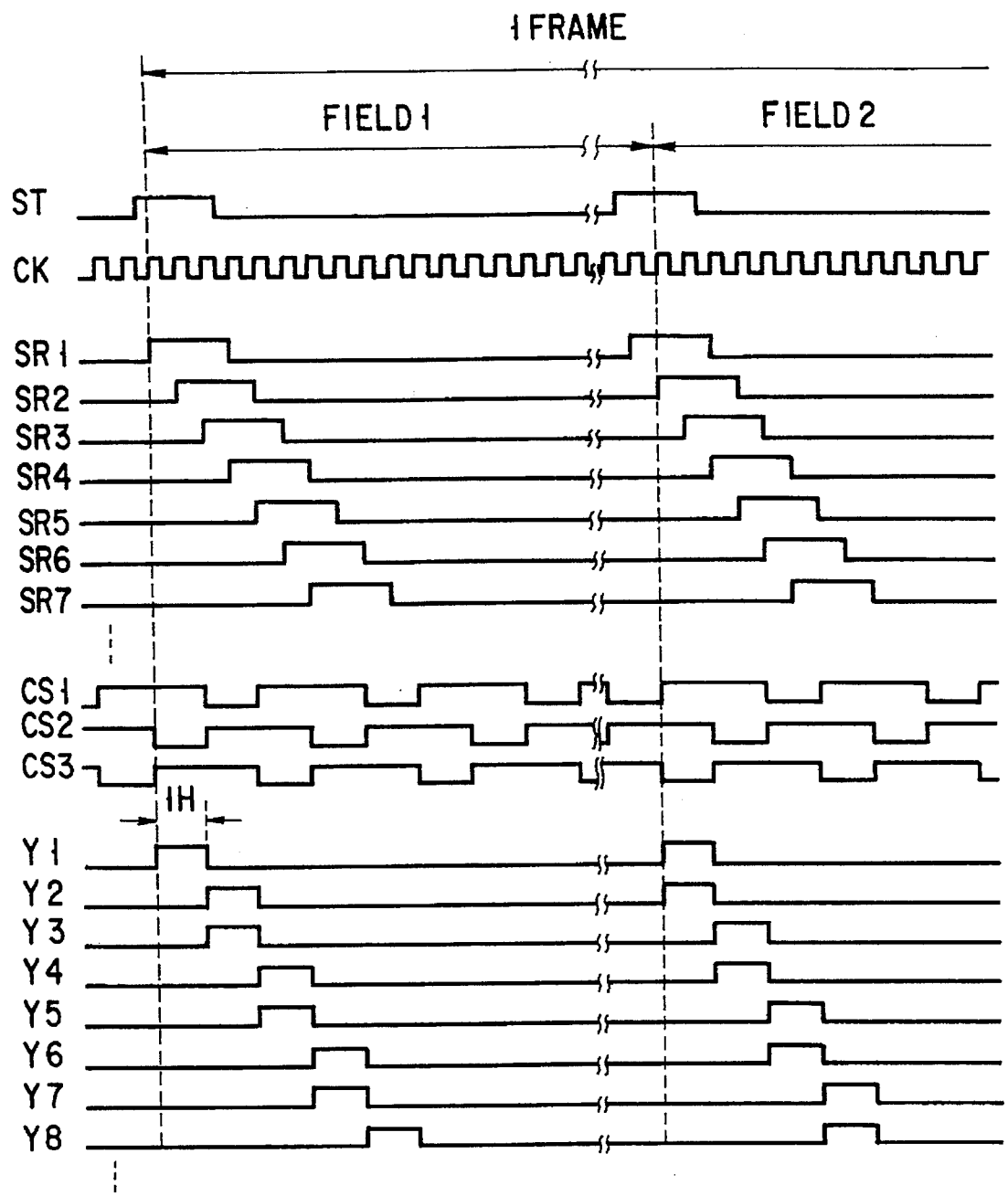
FIG. 5 is a timing chart showing various signals produced in the display controller shown in FIG. 4 when an NTSC video signal is supplied thereto.

A video signal VS is supplied to the detector 61, the detector 61 measures a period of the interval between vertical sync. signals contained in the video signal VS, and detects which one of the NTSC scheme and the PAL scheme is used in the video signal VS, based on the number of the horizontal picture signals corresponding to the measured period. When the video signal is detected to be of the NTSC scheme, the control signal generator 71 generates the start signal ST, the clock signal CK, and the selection control signals CS1, CS2, and CS3 in the first form shown in FIG. 5. The clock signal CK is a signal in which a first-type clock having a preset period is repeated. The start signal ST and the clock signal CK are supplied to the shift register section 32 of the Y-driver 31. The shift register section 32 repeatedly performs a shift operation in synchronism with the clock signal CK. A result of the shift operation is supplied from the first to 470th bit output terminals of the shift register section 32 to the AND gates G1–G470. In FIG. 5, SR1 to SR7 denote drive signals obtained by the first to seventh bit output terminals of the shift register 32. Each drive signal has a duration corresponding to three clocks. The AND gates G1–G470 selectively supply the drive signals obtained from the first to 470th bit output terminals of the shift register section 32 to the row lines Y1–Y470 of the display panel 1 according to the preset one of the selection control signals CS1, CS2, and CS3. This enables that the Y-driver circuit 31 selects all the row lines in each scanning of first and second fields. In this selecting operation, two row lines are simultaneously selected in a horizontal scanning period to assign the two horizontal pixel lines to a single horizontal picture signal. In addition, the horizontal picture signals are displayed in the first and second fields with a positional difference for one line, by selecting only the row line Y1 in the scanning of the first field and adjacent row lines Y1 and Y2 in the scanning of the second field, for example. More specifically, in the scanning of the first field, the row line Y1, the row lines Y2 and Y3, the row lines Y4 and Y5, . . . , the row lines Y468 and Y469, and the row line Y470 are sequentially selected. In scanning of the second field, the row lines Y1 and Y2, the row lines Y3 and Y4, . . . , the row lines Y467 and Y468, the row lines Y469 and Y470 are sequentially selected. Each selection is continued for one horizontal scanning period.

In the case where the NTSC video signal VS contains 471 effective horizontal picture signals S1–S471 for this display panel 1, the horizontal picture signals S1–S236 are used in the scanning of the first field, and the horizontal picture signals S237–S471 are used in the scanning of the second field.

Further, the horizontal picture signals are assigned to the horizontal pixel lines so as to display them at the same positions as in a CRT display. For example, in the CRT display, the position of displaying the horizontal picture signal S239 for the second field is determined between the positions where the horizontal picture signals S3 and S4 for the first field are displayed. Therefore, also in the liquid crystal display panel 1, the position for displaying the horizontal picture signal S239 is determined between the positions where the horizontal picture signals S3 and S4 are displayed.

The X-driver 51 performs a sample and hold operation on the horizontal picture signals sequentially provided for one field, and supply 1440 sampled signals obtained from each horizontal picture signal to the column lines X1–X1440 during the period in which at least one corresponding horizontal pixel line is selected. In the scanning of the first field, the horizontal pixel lines L1–L470 of the display panel 1 are assigned to all the horizontal picture signals S1–S236, which are not decimated, as shown in FIG. 7A. The horizontal pixel line L1 displays the horizontal picture signal S1 in the first horizontal scanning period, the horizontal pixel lines L2 and L3 display the horizontal picture signal S2 in the second horizontal scanning period, and the horizontal pixel lines L4 and L5 display the horizontal picture signal S3 in the third horizontal scanning period. In the scanning of the second field, the horizontal pixel lines L1–L470 of the display panel 1 are assigned to all the horizontal picture signals S237–S471, which are not decimated, as shown in FIG. 7B. The horizontal pixel lines L1 and L2 display the horizontal picture signal S237 in the 237th horizontal scanning period, the horizontal pixel lines L3 and L4 display the horizontal picture signal S238 in the 238th horizontal scanning period, and the horizontal pixel lines L5 and L6 display the horizontal picture signal S239 in the 239th horizontal scanning period.

As described above, when an NTSC video signal is supplied, the display controller 2 performs a control in which two pixel lines are assigned basically to one horizontal picture signal.

On the other hand, when the video signal is detected to be of the PAL scheme by the detector 61, the control signal generator 71 generates the start signal ST, the clock signal CK, and the selection control signals CS1, CS2, and CS3 in the second form shown in FIG. 6. Unlike the case where the NTSC video signal is supplied, the clock signal CK is a signal in which a second-type clock having a period twice that of the first-type clock and four first-type clocks succeeding the first-type clock are provided, and a series of the first- and second-type clocks is repeated. The start signal ST and the clock signal CK are supplied to the shift register section 32 of the Y-driver 31. The shift register section 32 repeatedly performs a shift operation in synchronism with the clock signal CK. A result of the shift operation is supplied from the first to 470th bit output terminals of the shift register section 32 to the AND gates G1–G470. In FIG. 6, SR1 to SR7 denote drive signals obtained by the first to seventh bit output terminals of the shift register 32. Each drive signal has a duration corresponding to three clocks. The AND gates G1–G470 selectively supply the drive signals obtained from the first to 470th bit output terminals of the shift register section 32 to the row lines Y1–Y470 of the display panel 1 according to the preset one of the selection control signals CS1, CS2, and CS3. This enables that the Y-driver circuit 31 selects all the row lines in each scanning of first and second fields. In this selecting operation, one or two row lines are simultaneously selected in a horizontal scanning period to assign five horizontal pixel lines to three horizontal picture signals. In addition, the horizontal picture signals are displayed in the first and second fields with a positional difference for one line, by selecting only the row line Y1 in the scanning of the first field and adjacent row lines Y1 and Y2 in the scanning of the second field, for example. More specifically, in the scanning of the first field, the row line Y1, the row lines Y2 and Y3, the row lines Y4 and Y5, . . . , the row lines Y469 and Y470 are sequentially selected. In scanning of the second field, the row lines Y1 and Y2, the row lines Y3 and Y4, . . . , the row lines Y468 and Y469, the row line Y470 are sequentially selected. Each selection is continued for one horizontal scanning period.

In the case where the PAL video signal VS contains 564 effective horizontal picture signals S1–S564 for this display panel 1, the horizontal picture signals S1–S282 are used in the scanning of the first field, and the horizontal picture signals S283–S564 are used in the scanning of the second field.

Likewise the display operation for the NTSC video signal, the horizontal picture signals are assigned to the horizontal pixel lines so as to display them at the same positions as in a CRT display. For example, in the CRT display, the position of displaying the horizontal picture signal S285 for the second field is determined between the positions where the horizontal picture signals S3 and S4 for the first field are displayed. Therefore, also in the liquid crystal display panel 1, the position for displaying the horizontal picture signal S285 is determined between the positions where the horizontal picture signals S3 and S4 are displayed.

The X-driver 51 performs a sample and hold operation on the horizontal picture signals sequentially provided for one field, and supply 1440 sampled signals obtained from each horizontal picture signal to the column lines X1–X1440 during the period in which at least one corresponding horizontal pixel line is selected. In the scanning of the first field, the horizontal pixel lines L1–L470 of the display panel 1 are assigned to all the horizontal picture signals S1–S282, which are not decimated, as shown in FIG. 8A. The horizontal pixel line L1 displays the horizontal picture signal S1 in the first horizontal scanning period, the horizontal pixel lines L2 and L3 display the horizontal picture signal S2 in the second horizontal scanning period, the horizontal pixel lines L4 and L5 display the horizontal picture signal S3 in the third horizontal scanning period, and the horizontal pixel line L6 displays the horizontal picture signal S4 in the fourth horizontal scanning period. In the scanning of the second field, the horizontal pixel lines L1–L470 of the display panel 1 are assigned to all the horizontal picture signals S283–S564, which are not decimated, as shown in FIG. 8B. The horizontal pixel lines L1 and L2 display the horizontal picture signal S283 in the 283th horizontal scanning period, the horizontal pixel lines L3 and L4 display the horizontal picture signal S284 in the 284th horizontal scanning period, and the horizontal pixel line L5 displays the horizontal picture signal S285 in the 285th horizontal scanning period.

As described above, when a PAL video signal is supplied, the display controller 2 performs a control in which five pixel lines are assigned basically to three horizontal picture signals.

In the embodiment described above, the display controller 2 sequentially selects the horizontal pixel lines, in a preset number every time a horizontal picture signal is supplied to each of the horizontal pixel lines in order to assign the 470 horizontal pixel lines to almost all the horizontal picture signals. The preset number is updated on the basis of a selection pattern in which at least first and second numbers of horizontal picture lines are determined as selection units of lines to be selected at one time, the selection units are combined at a predetermined ratio, and the combination of the selection units is repeated for each predetermined number of the horizontal picture signals. Therefore, a difference between the number of horizontal picture signals in a video signal and the number of horizontal pixel lines in a flat panel display can be compensated for without decimating the horizontal picture signals. In this case, a frame memory for storing a video signal is not required, for example. Since all the effective horizontal picture signals in the video signal are used to display an image, the image quality can be prevented from being lowered.

Since the number of horizontal pixel lines to be selected at one time is updated on the basis of the selection pattern, a complicated timing control is not needed to supply each horizontal picture signal to the horizontal pixel lines. Accordingly, it is not necessary to provide additional line memories or frame memories. In addition, since logic circuits of general use such as AND gates can be used for the control of updating the number of horizontal pixel lines to be selected at one time, it is possible to reduce the manufacturing cost of the display control apparatus.

Moreover, the display control apparatus performs a control in which the horizontal picture signals are displayed in the first and second fields with a positional difference. This can effectively solve the problem that oblique lines are noticeably made discontinuous in the displayed image. Since the positional difference is not set more than one horizontal pixel line, the clearness of the displayed image can be maintained sufficiently. When a PAL signal is supplied, some of the horizontal picture signals contained in this video signal is supplied to one horizontal picture line. However, this rate is lower than a rate in which a horizontal picture signal is supplied to two horizontal pixel lines. Therefore, the discontinuity of oblique lines and the like becomes unnoticeable.

Further, the liquid crystal display device of this embodiment detects the scheme of a video signal. Therefore, the form of controlling the display panel 1 is automatically switched according to the detected scheme of the video signal.

In the embodiment, when a PAL video signal is supplied, the horizontal pixel line L1, the horizontal pixel lines L2 and L3, and horizontal pixel lines L4 and L5 are assigned to the horizontal picture signals S1, S2, and S3, respectively. However, another combination of the pixel lines can be used to assign five horizontal pixel lines to three horizontal picture signals. In order to obtain a clear image, it is preferable that the horizontal picture signals are displayed at the same positions as in a CRT display.

The liquid crystal display panel 1 includes pixels arrayed in a 470×1440 matrix. However, the matrix is not limited to have this size, and various size can be used.

Further, in the selection pattern, the ratio of a first selection unit in which one horizontal pixel line is selected in one horizontal scanning period and a second selection unit in which two horizontal pixel lines are selected in one horizontal scanning period and the repetition unit of their combination can be freely set according to the matrix size of the display panel 1 and the scheme of a video signal.

In addition, the horizontal picture signals can be assigned to the horizontal pixel lines in various forms corresponding to the matrix size of the display panel 1 and the scheme of a video signal. The various forms include a form in which each horizontal picture signal is assigned to one or three successive horizontal pixel lines, a form in which each horizontal picture signal is assigned to two or three successive horizontal pixel lines, and a form in which each horizontal picture signal is assigned to one, two, or three horizontal pixel lines. However, each horizontal picture signal should be assigned to one or two successive horizontal pixel lines as described in the embodiment so as to obtain a good image quality. Further, the horizontal picture signals should be displayed at the same positions as in a CRT display so as to obtain a clear image.

When each horizontal picture signal is assigned in a form different from that of the embodiment, the waveforms and the number of selection control signals supplied to Y-driver 31 must be changed appropriately.

In the embodiment described above, an array of pixels includes columns of red pixels, green pixels, and blue pixels defined by the color filter 22. However, the horizontal pixel lines can be twisted by half the pixel pitch.

Further, red, green, and blue pixels can be arranged in a delta form. In this case, the number of column lines each connected to the pixels of the same color component becomes about twice.

Further, a manual switch can be provided to select one of a first display control of driving the display panel 1 by an NTSC video signal and a second display control of driving the display panel by a PAL video signal.

The display panel 1 can be replaced by another display such as a CRT display, an EL display, or the like. However, the present invention is suitable for a liquid crystal display having a disadvantage that the image quality is lowered due to the interlace scanning of the horizontal pixel lines.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims

What is claimed is:

1. A display control apparatus for driving a display having N horizontal pixel lines in accordance with a video signal containing M horizontal picture signals per field, M being less than N, comprising:

supplying means for obtaining each of the horizontal picture signals from said video signal, and supplying the obtained signal to each of said horizontal pixel lines; and selecting means for sequentially selecting said horizontal pixel lines, in a preset number every time said supplying means supplies a horizontal picture signal to each of said horizontal pixel lines; wherein said selecting means includes updating means for updating said preset number on the basis of a selection pattern in which at least first and second numbers of horizontal picture lines are determined as selection units of lines to be selected at one time, said selection units are combined at a predetermined ratio, and the combination of the selection units is repeated for each predetermined number of said horizontal picture signals.

2. A display control apparatus according to claim 1, wherein said display includes a matrix array of pixels, the rows of which serve as said horizontal pixel lines, row lines formed along the rows of the pixels and each connected to the pixels in a corresponding row, and column lines formed along columns of the pixels and each connected to the pixels in a corresponding column, said supplying means is connected to said column lines to supply the obtained horizontal picture signal.

3. A display control apparatus according to claim 1, wherein said selecting means includes shift register means, having one to N-bit output terminals, for performing a shifting operation synchronous with a clock signal to sequentially produce drive signals from said output terminals, each drive signal having a duration determined by a predetermined number of clocks, said updating means includes logic gate means for selecting at least one of said row lines based on the drive signal, and control means for controlling a clock period of said clock signal and the operation of said logic gate means on the basis of said selection pattern.

4. A display control apparatus according to claim 2, wherein said logic gate means includes N switching gates each connected between a corresponding output terminal of said shift register means and a corresponding row line.

5. A display control apparatus according to claim 1, wherein the order of said selection units is determined, when said video signal contains horizontal picture signals for two fields per frame, to display images shifted by one horizontal pixel line between the first and second fields.

6. A display control apparatus according to claim 1, further comprising detecting means for detecting a scheme of said video signal, and setting said selection pattern according to the detected scheme.

7. A display control apparatus according to claim 2, wherein said matrix array of pixels has a configuration in which columns of red pixels, green pixels, and blue pixels are repeatedly arrayed in a row direction.

8. A display control method for driving a display having N horizontal pixel lines in accordance with a video signal containing M horizontal picture signals per field, M being less than N, comprising the steps of:

obtaining each of the horizontal picture signals from said video signal, and supplying the obtained signal to each of said horizontal pixel lines; and sequentially selecting said horizontal pixel lines, in a preset number every time said supplying step supplies a horizontal picture signal to each of said horizontal pixel lines; wherein said selecting step includes a step of updating said preset number on the basis of a selection pattern in which at least first and second numbers of horizontal picture lines are determined as selection units of lines to be selected at one time, said selection units are combined at a predetermined ratio, and the combination of the selection units is repeated for each predetermined number of said horizontal picture signals.

9. A display control method according to claim 8, wherein said display includes a matrix array of pixels, the rows of which serve as said horizontal pixel lines, row lines formed along the rows of the pixels and each connected to the pixels in a corresponding row, and column lines formed along columns of the pixels and each connected to the pixels in a corresponding column, the obtained horizontal picture signal is supplied to said column lines.

10. A display control method according to claim 8, wherein said selecting step includes a step of using shift register means which has one to N bit output terminals and performs a shifting operation in synchronism with a clock signal to sequentially produce drive signals from said output terminals, each drive signal having a duration determined by a predetermined number of clocks, said updating step includes a step of using logic gate means to select at least one of said row lines based on the drive signal, and a step of controlling a clock period of said clock signal and the operation of said logic gate means on the basis of said selection pattern.

11. A display control method according to claim 9, wherein said logic gate means includes N switching gates each connected between a corresponding one of the output terminals of said shift register means and a corresponding one of said row lines.

12. A display control method according to claim 8, wherein the order of said selection units is determined, when said video signal contains horizontal picture signals for two fields per frame, to display images shifted by one horizontal pixel line between the first and second fields.

13. A display control method according to claim 8, further comprising a step of detecting a scheme of said video signal, and setting said selection pattern according to the detected scheme.

14. A display control method according to claim 9, wherein said matrix array of pixels has a configuration in which columns of red pixels, green pixels, and blue pixels are repeatedly arrayed in a row direction.

* * * * *